US012761990B2

(12) United States Patent
Chen

(10) Patent No.: US 12,761,990 B2
(45) Date of Patent: Oct. 13, 2026

(54) POLICY DRIVEN SERVICE INSERTION WITH MIDDLEWARE FOR CLOUD APPLICATIONS

(71) Applicant: Palo Alto Networks, Inc., Santa Clara, CA (US)

(72) Inventor: Min Hao Chen, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 350 days.

(21) Appl. No.: 18/632,953

(22) Filed: Apr. 11, 2024

(65) Prior Publication Data

US 2025/0321812 A1 Oct. 16, 2025

(51) Int. Cl.
*G06F 9/54* (2006.01)

(52) U.S. Cl.
CPC ........ *G06F 9/546* (2013.01); *G06F 2209/547* (2013.01)

(58) Field of Classification Search
None
See application file for complete search history.

(56) References Cited

U.S. PATENT DOCUMENTS

| | | | | |
|---|---|---|---|---|
| 2007/0156808 A1* | 7/2007 | Koegel | G06F 9/546 | 709/203 |
| 2009/0116380 A1* | 5/2009 | Santiago | H04L 47/83 | 370/229 |
| 2012/0005286 A1* | 1/2012 | Bhasin | G06F 9/546 | 709/206 |
| 2013/0007377 A1* | 1/2013 | Winn | G06F 9/546 | 711/147 |
| 2019/0018718 A1* | 1/2019 | Phillips | G06F 9/546 | |
| 2025/0258728 A1* | 8/2025 | Zhu | G06F 9/547 | |

* cited by examiner

*Primary Examiner* — Raqiul A Choudhury
(74) *Attorney, Agent, or Firm* — Gilliam IP PLLC

(57) ABSTRACT

Middleware forwards packets to a service prior to modification according to functionality of the middleware. Packets received from the service are identified as having been previously received. The packets are then modified by the middleware and forwarded to a destination. A hash of a packet and a TTL thereof may be stored by the middleware prior to forwarding the packet to the service. The TTL of the packet may be decremented before forwarding. A packet having a hash matching a stored hash and a TTL lower than the stored TTL may be deemed to have been previously received. Modification may include NAT, encryption, and/or description. The service may be a firewall, IDS, and/or IPS.

20 Claims, 4 Drawing Sheets

POLICY DRIVEN SERVICE INSERTION WITH MIDDLEWARE FOR CLOUD APPLICATIONS

FIELD OF THE INVENTION

The present invention relates generally to systems and methods for implementing middleware with respect to networking traffic, particularly in a cloud computing platform.

BACKGROUND OF THE INVENTION

Demands of security may require that network traffic be evaluated when entering and leaving a portion of a network. For example, a service, such as a firewall, intrusion detection system (IDS), and/or intrusion prevention system (IPS) may examine packets entering and/or leaving a network.

It would be an advancement in the art to implement an improved solution for using a service to inspect network traffic, particularly for cloud-based applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 is a schematic block diagram of components for managing access to cloud-based applications in accordance with an embodiment of the present invention;

DETAILED DESCRIPTION

Figure 1:
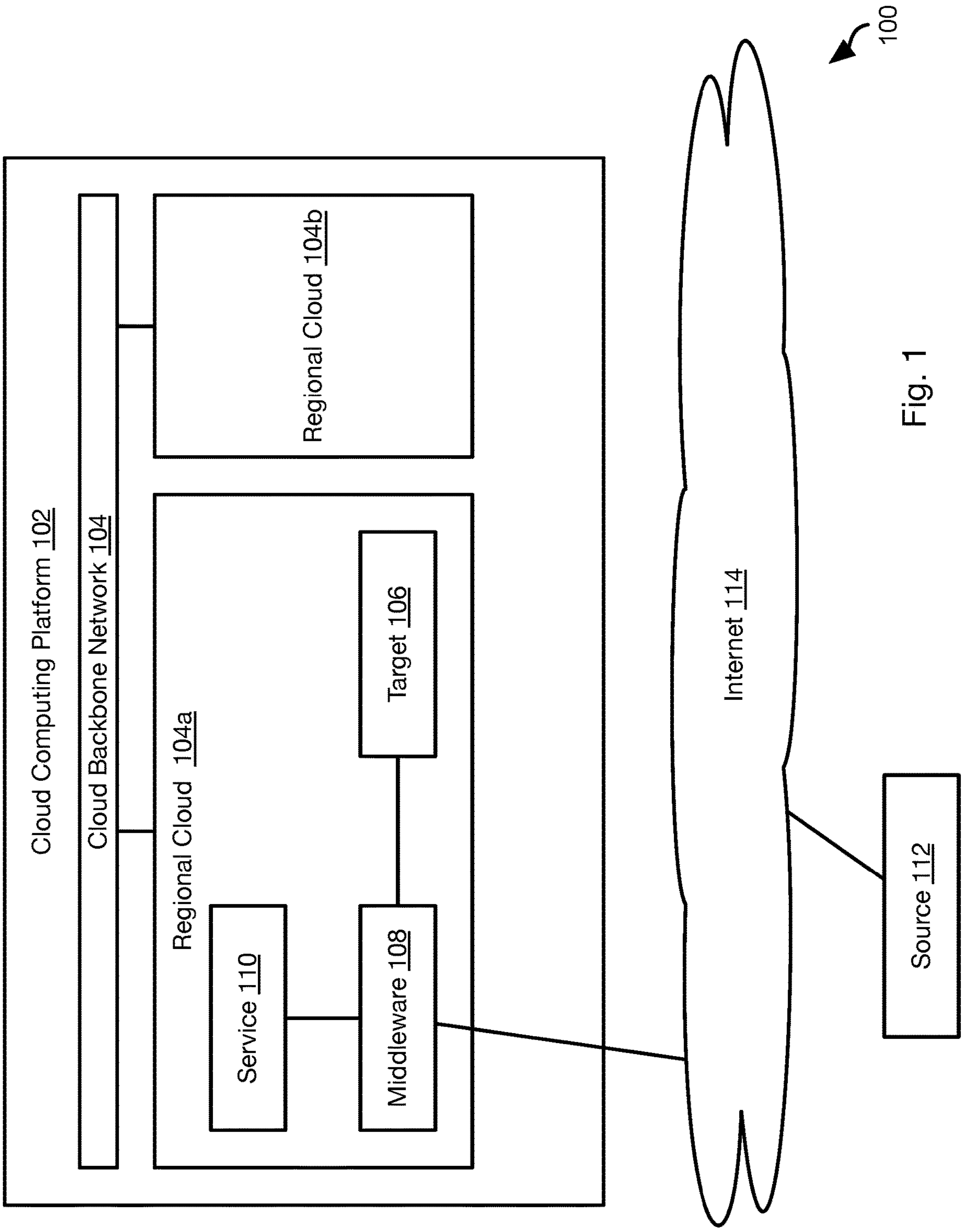
FIG. 1 is a schematic block diagram of a network environment for implementing a service with respect to cloud-based applications in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Referring to FIG. 1, a network environment 100 may include one or more cloud computing platforms 102, such as AMAZON WEB SERVICES (AWS), MICROSOFT AZURE, GOOGLE CLOUD PLATFORM (GCP), ORACLE CLOUD INFRASTRUCTURE, or the like. Multiple cloud computing platforms 102 from multiple providers may be used simultaneously. As known in the art, a cloud computing platform 102 may be embodied as a set of computing devices coupled to networking hardware and providing virtualized computing and storage resources such that a user may instantiate and execute applications, implement virtual networks, and allocate and access storage without awareness of the underling computing devices and network hardware. Each cloud computing platform 102 may implement some or all aspects of the cloud computing model described above. One or more of the cloud computing platforms 102 may be a public cloud providing cloud computing services to multiple entities for a fee. One or more of the cloud computing platforms 102 may also be a private cloud computing platform built and maintained on a premise of the entity utilizing the private cloud computing platform 102. In some implementations, systems and methods described herein may be implemented by a combination of one or more public private cloud computing platforms 102 and one or more private cloud computing platforms 102.

A cloud computing platform 102 from the same provider may be divided into different regional clouds, each regional cloud including a set of computing devices in or associated with a geographic region and connected by a regional network. These regional clouds may be connected to one another by a cloud backbone network 104. The cloud backbone network 104 may provide high throughput and low latency network connections for traffic among a plurality of regional clouds 104*a*, 104*b*. The cloud backbone network 104 may include routers, switches, servers and/or other networking components connected by high-capacity fiber optic networks, such as transoceanic fiber optic cables, the Internet backbone, or other high-speed network. Each regional cloud 104*a*, 104*b* may include cloud computing devices and networking hardware located in and/or processing traffic from a particular geographic region, such as a country, state, continent, or other arbitrarily defined geographic region.

A target 106 may execute in a regional cloud 104*a*. The target 106 may be an application, service, database, or any other executable or computing resource in the regional cloud 104*a*. In some implementations, traffic to and from the target 106 may be constrained to pass through middleware 108. The middleware 108 may execute in the same regional cloud 104*a* or in a different regional cloud 104*b* of the same cloud computing platform 102 or a different cloud computing platform 102. The middleware 108 may modify packets received thereby and forward the modified packets to a destination, such as the target 106 or a destination for packets transmitted by the target 106. For example, the middleware 108 may perform a networking function (e.g., network address translation (NAT)), a security function (e.g., encryption and/or decryption)), or perform some other function.

A service 110 may execute in the regional cloud 104*a* or in a different regional cloud 104*b* of the same cloud computing platform 102 or a different cloud computing platform 102. The service 110 may inspect packets for purposes of promoting security of a network. For example, the service 110 may be a firewall, intrusion detection system (IDS), and/or intrusion prevention system (IPS) may examine packets entering and/or leaving a network. The function of the service 110 may be enhanced when packets evaluated by the service 110 have not been modified by the middleware 108.

For example, a source 112, such as user device, server, or other computing device may transmit a packet to the middleware 108, such as by way of an intermediate network, such as the Internet 114. Packets may likewise be transmitted from the target 106 to the source 112.

Figure 2A:
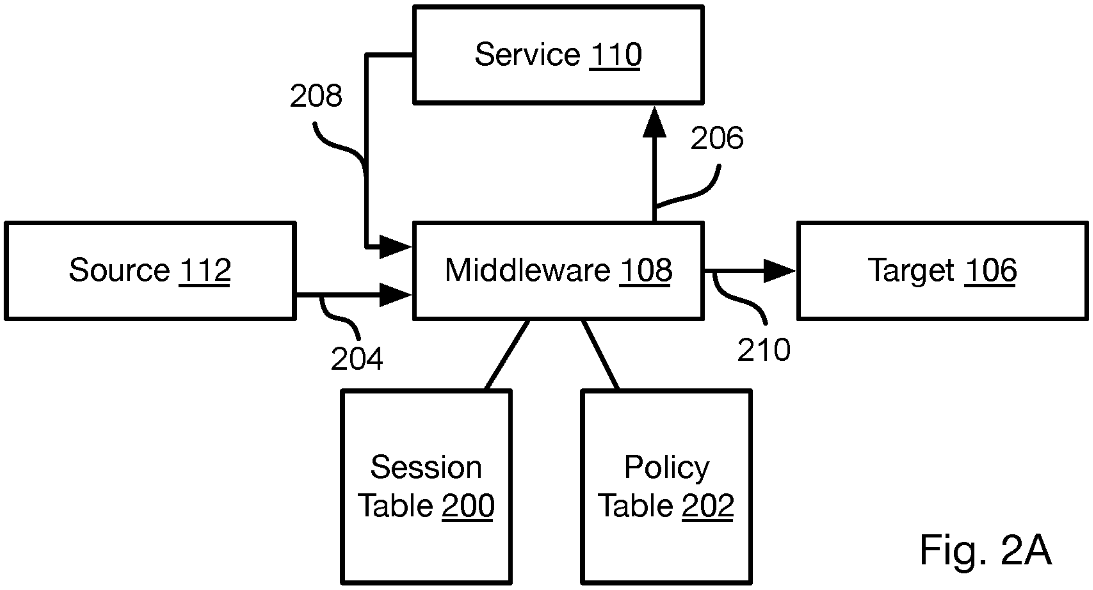
FIGS. 2A and 2B are schematic block diagrams illustrating the flow of traffic to a service facilitated by middleware in accordance with an embodiment of the present invention.

Referring to FIG. 2A, the middleware 108 may use one or both of a session table 200 and a policy table 202 to route packets. The policy table 202 provides rules defining what packets must be sent to the service 110 and which may be forwarded directly to the target 106 or source 112 in bypass of the service 110. The session table 200 may be used to one or both of (a) record decisions regarding the routing of packets for a connection such that the policy table 202 does not need to be consulted for each packet and (b) distinguish between packets received from the service 110 and packets received from the source 112 and/or target 106.

The middleware 108 may receive 204 a packet from the source 112 and determine, based on the policy table 202 (or a previously recorded decision in the session table 200) whether the packet is to be sent 206 to the service 110 or forwarded 210 to the target 106. The middleware 108 may further make an entry in the session table 200 referencing the packet in response to receiving 204 the packet. The middleware 108 may additionally or alternatively label the packet and forward the packet as labeled to the service 110. The label does not impact the evaluation by the service 110 and may include any change to the packet enabling the packet to be identified as previously received by the middleware 108.

If sent 206 to the service 110, the service 110 evaluates the packet and, if the packet is not blocked by the service 110, the service 110 sends 208 the packet to the middleware 108. The middleware 108 receives the packet from the service 110 and evaluates whether the packet is referenced in the session table 200. For example, the middleware 108 may determine whether the session table 200, alone or in combination with any labeling of the packet, indicates that the packet was previously received. If so, the packet may be modified according to the function (NAT, decryption, encryption, etc.) of the middleware 108 and forwarded 210 to the target 106.

Figure 2B:
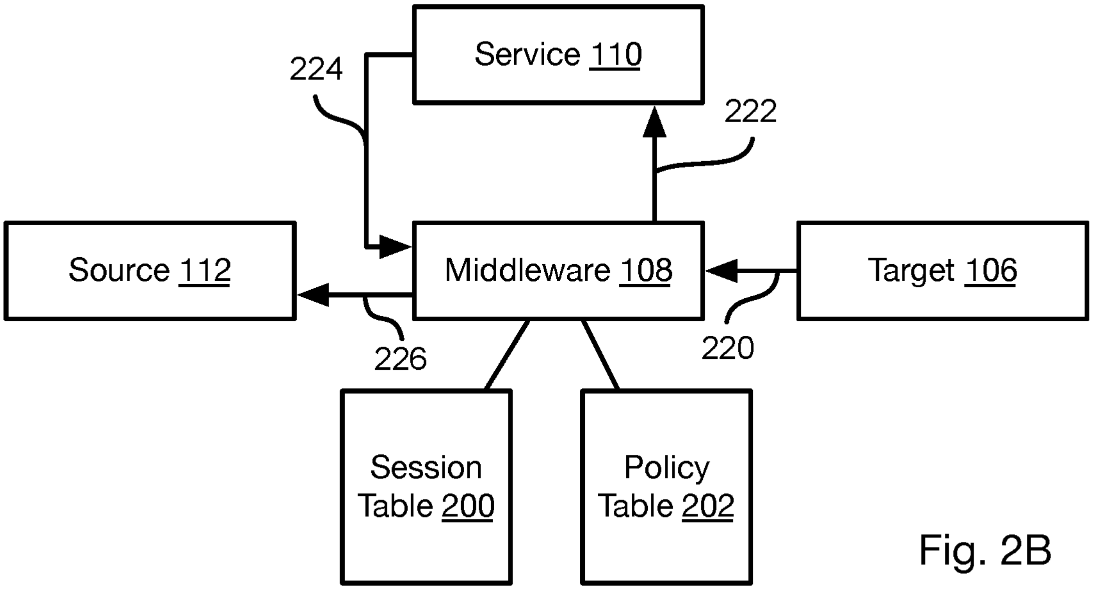

Referring to FIG. 2B, packets transmitted from the target 106 and addressed to the source 112 may be processed in a like manner as a packet from the source 112 to the target 106. For example, the middleware 108 may receive 220 a packet from the target 106 and determine, based on the policy table 202 (or a previously recorded decision in the session table 200) whether the packet is to be sent 226 to the service 110 or forwarded 222 to the source 112. The middleware 108 may further make an entry in the session table 200 referencing the packet in response to receiving 204 the packet. The middleware 108 may additionally or alternatively label the packet and forward the packet as labeled to the service 110. The label does not impact the evaluation by the service 110 and may include any change to the packet enabling the packet to be identified as previously received by the middleware 108.

If sent 222 to the service 110, the service 110 evaluates the packet and, if the packet is not blocked by the service 110, the service 110 sends 224 the packet to the middleware 108. The middleware 108 receives the packet from the service 110 and evaluates whether the packet is referenced in the session table 200. For example, the middleware 108 may determine whether the session table 200, alone or in combination with any labeling of the packet, indicates that the packet was previously received. If so, the packet may be modified according to the function (NAT, decryption, encryption, etc.) of the middleware 108 and forwarded 226 to the source 112.

In FIGS. 2A and 2B, reference is made to "the packet." As used herein packets transmitted at various stage of a process may be deemed to be the same packet provided they are materially identical. For example, packets may be deemed to be the same packet where the packets are identical except for changes to a TTL (time to live) value. Packets may be materially identical where the only change includes a label that does not change any other attribute of the packet.

Figure 3:
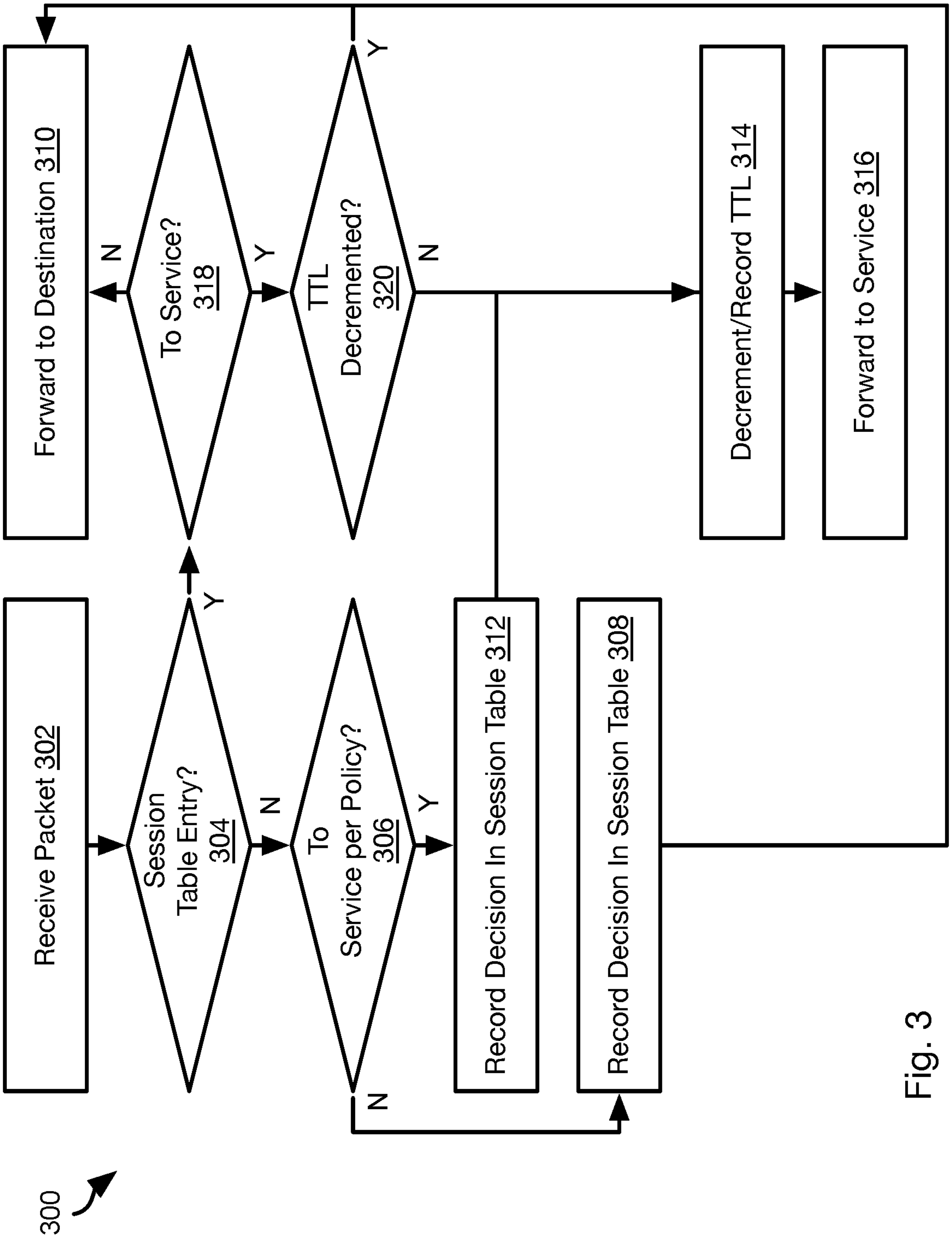
FIG. 3 is a process flow diagram of a method for routing of packets by middleware with respect to a service in accordance with an embodiment of the present invention.

FIG. 3 illustrates a method 300 that may be executed by the middleware 108. The method 300 may be used to route packets between the source 112, target 106, and service 110. In particular, the method 300 provides a more detailed explanation of an approach for distinguishing between (a) packets received from the source 112 or target 106 and (b) packets that were previously sent to the service 110. The method 300 further enables doing so in scenarios where the same packet may be transmitted multiple times by a source 112 and/or target 106. In the following description, the "destination" of a packet may refer to either the source 112 or the target 106 and the "source" of a packet may refer to either of the target 106 or the source 112.

The method 300 may include receiving 302 a packet and evaluating 304 whether an entry in the session table 200 references the packet. If not, the method 300 may include evaluating 306 whether the packet should be sent to the service 110 according to the policy table 202. If not, then this fact is recorded 308 in the session table. In particular, identifying information sufficient to identify a packet may be stored in an entry in the session table. The identifying information may include the source and destination addresses of the packet, and possibly other attributes of the packet, such as a port number. In some embodiments, the identifying information additionally or alternatively includes a hash computed from any of the above-listed items of information and possibly other data in one or more headers of the packet, such as a sequence number that is unique to each packet in a session. The hash may then be stored in the entry in the session table. The entry may include an indication that packets having the identifying information, are to be forwarded to the destination address without forwarding the packets to the service 110. The packet may then be forwarded 310 to the destination in bypass of the service 110. Forwarding 310 the packet may include processing the packet according to the functionality of the middleware 108 (NAT, encryption, decryption, etc.) to obtain a modified packet and forwarding 310 the modified packet to the destination.

If the packet is to be forwarded to the service 110 according to the policy table, this fact may be recorded 312 in the entry in the session table 200, e.g., in an entry including some or all of the identifying information as defined above. Step 312 may include recording, in the entry, an indication that packets matching the source and destination addresses, and possibly the other information in the entry, are to be forwarded to the service 110.

A time to live (TTL) of the packet may also be decremented 314 and recorded in the entry in the session table 200. The TTL may be an integer value that may be decremented when traversing certain network infrastructure in normal operation. The middleware 108 does not decrement the TTL when forwarding 310 the packet in some embodiments. The packet with the decremented TTL may then be forwarded 316 to the service 110.

If an entry corresponding to the packet is found in the session table 200 at step 304, the method 300 may include evaluating 318 the forwarding behavior indicated in the entry. If the entry does not indicate that the packet should be forwarded to the service 110, the packet is forwarded 310 to the destination of the packet, as described above for forwarding step 310.

If the entry indicates that the packet should be forwarded to the service 110, the method 300 may include evaluating 320 whether the entry indicates that the TTL of the packet has been decremented. For example, if a hash of the entry matches a hash of the packet and the TTL of the packet is higher than the TTL recorded in the entry, the TTL of the packet has not been decremented. The hash of the packet may be generated using the same items of information from the packet that are used to generate hashes stored in the session table 200 as described above. If the hash of the entry matches the hash of the packet and the TTL of the packet is the same as or lower than the TTL recorded in the entry, the TTL has been decremented. If the TTL was decremented, the packet is forwarded 310 to the destination, as described above for forwarding step 310. If the TTL was not decremented, the TTL of the packet may be decremented 314 and recorded and forwarded 316 to the service 110, as described above.

As is apparent, decrementing of the TTL is used as a form of a label that enables the middleware 108 to determine whether a packet was forwarded to the service 110. Using the TTL further facilitates proper behavior with respect to retransmitted packets: packets with undecremented TTLs are correctly sent to the service 110 even though the entry in the session table 200 may indicate that a materially identical packet (e.g., matching hash) was already received. Using the TTL as a label further does not interfere with operation of the service 110. Other labels may also be used in addition to, or in place of, decrementing of the TTL.

Figure 4:
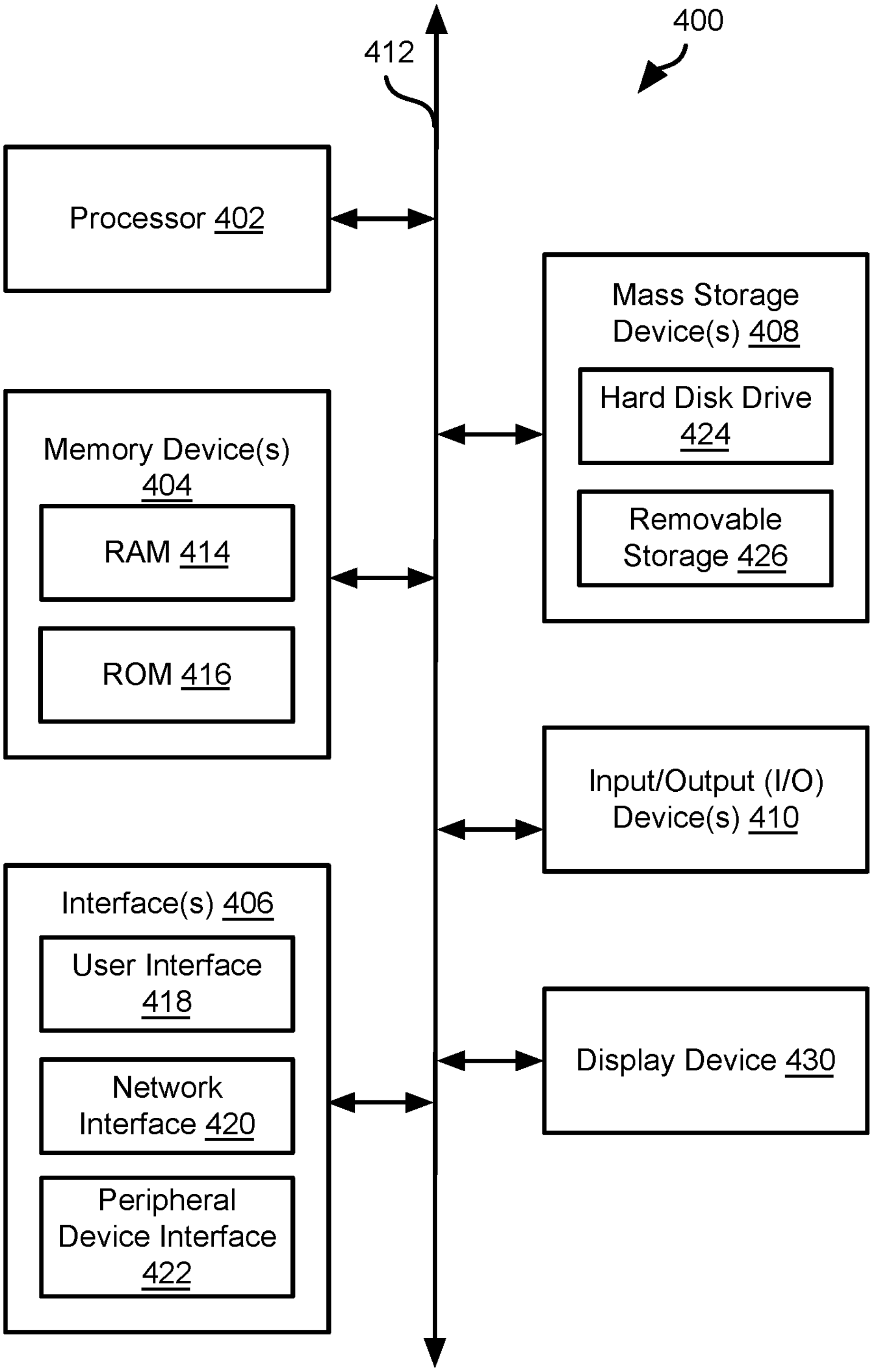
FIG. 4 is a schematic block diagram of a computing device that may be used to implement the systems and methods described herein.

FIG. 4 illustrates an example computing device 400 that may be used to implement a cloud computing platform or any other computing devices described above. In particular, components described above as being a computer or a computing device may have some or all of the attributes of the computing device 400 of FIG. 4. FIG. 4 is also a block diagram illustrating an example computing device 400 which can be used to implement the systems and methods disclosed herein.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interface(s) include user interface 418 and peripheral device interface 422. The interface(s) 406 may also include one or more user interface elements 418. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:

receiving, by middleware executing on a computing device, a first packet from a source;

(a) determining, by the middleware, by evaluating the first packet with respect to a policy, that the first packet should be sent to a service that is not a destination referenced by the first packet; and in response to (a):

forwarding, by the middleware, the first packet to a service that is not a destination referenced by the first packet;

receiving, by the middleware, a second packet from the service;

determining, by the middleware, that the second packet matches the first packet; and in response to determining that the second packet matches the first packet, forwarding, by the middleware, the second packet to the destination.

2. The method of claim 1, wherein forwarding the second packet to the destination comprises modifying, by the middleware, the second packet to obtain a modified packet and forwarding the modified packet to the destination.

3. The method of claim 2, wherein modifying the second packet comprises performing, by the middleware, at least one of network address translation of the second packet, encrypting the second packet, and decrypting the second packet.

4. The method of claim 1, wherein (a) comprises determining that a prior packet received prior to the first packet in a same session as the first packet was transmitted to the service according to the policy.

5. The method of claim 1, wherein the service is a firewall.

6. The method of claim 1, wherein the service is an intrusion detection system (IDS).

7. The method of claim 1, wherein the service is an intrusion protection system (IPS).

8. The method of claim 1, further comprising:

making an entry in a session table, the entry corresponding to the first packet;

wherein determining that the second packet matches the first packet comprises determining, by the middleware, that the second packet matches the entry.

9. The method of claim 8, wherein the entry includes a hash of a portion of the first packet.

10. The method of claim 8, further comprising:

storing, by the middleware, a time to live (TTL) of the first packet in the entry; and decrementing, by the middleware, the TTL of the first packet prior to forwarding the first packet to the service;

wherein determining that the second packet matches the first packet comprises determining, by the middleware, that a TTL of the second packet is less than the TTL of the first packet.

11. A system comprising:

one or more processing devices;

one or more memory devices coupled to the one or more processing devices, the one or more memory devices storing executable code that, when executed by the one or more processing devices, causes the one or more processing devices to:

receive, by middleware executed by the one or more processing devices, a first packet from a source;

forward, by the middleware, the first packet to a service that is not a destination referenced by the first packet;

receive, by the middleware, a second packet from the service;

determine, by the middleware, that the second packet matches the first packet; and in response to determining that the second packet matches the first packet, forward, by the middleware, the second packet to the destination.

12. The system of claim 11, wherein the middleware is configured to forward the second packet to the destination by modifying the second packet to obtain a modified packet and forwarding the modified packet to the destination.

13. The system of claim 12, wherein the middleware is configured to modify the second packet by performing network address translation of the second packet.

14. The system of claim 12, wherein the middleware is configured to modify the second packet by encrypting or decrypting the second packet.

15. The system of claim 11, wherein the service is a firewall.

16. The system of claim 11, wherein the service is an intrusion detection system (IDS).

17. The system of claim 11, wherein the service is an intrusion protection system (IPS).

18. The system of claim 11, wherein the middleware is configured to:

make an entry in a session table, the entry corresponding to the first packet;

wherein the middleware is configured to determine that the second packet matches the first packet by determining that the second packet matches the entry.

19. The system of claim 18, wherein the entry includes a hash of a portion of the first packet.

20. The system of claim 18, wherein the middleware is configured to:

store a time to live (TTL) of the first packet in the entry;

decrement the TTL of the first packet prior to forwarding the first packet to the service; and determine that the second packet matches the first packet by determining that a TTL of the second packet is less than the TTL of the first packet.

* * * * *